Dec. 18, 1923.
B. THOENS
FILTERING APPARATUS
Filed Aug. 4, 1917
1,477,986
2 Sheets-Sheet 1
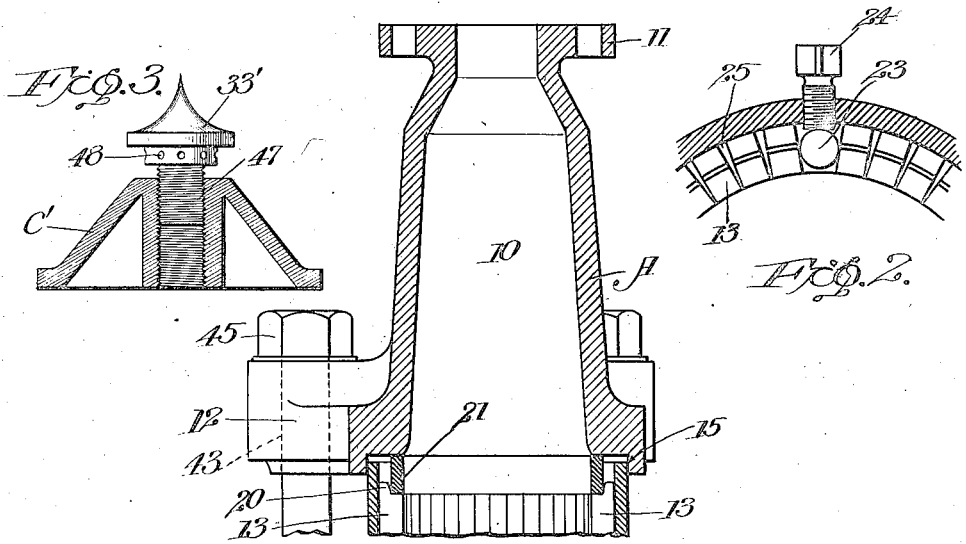
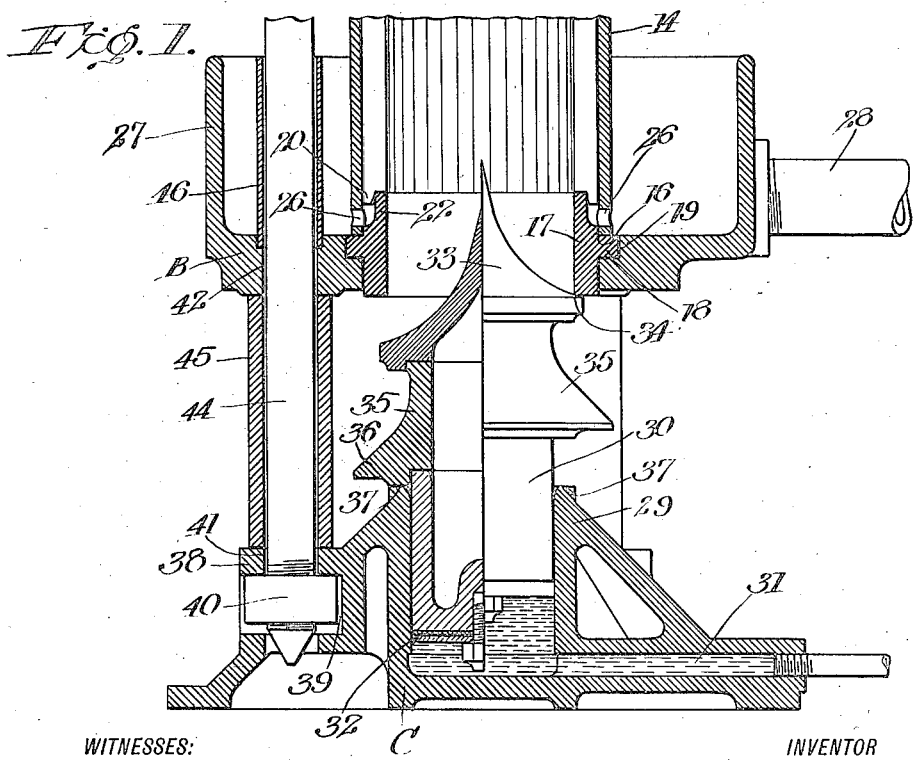
WITNESSES:
G. L. Baker
INVENTOR
Burchard Thoens
Foster, Freeman, Watson & Coit
ATTORNEY

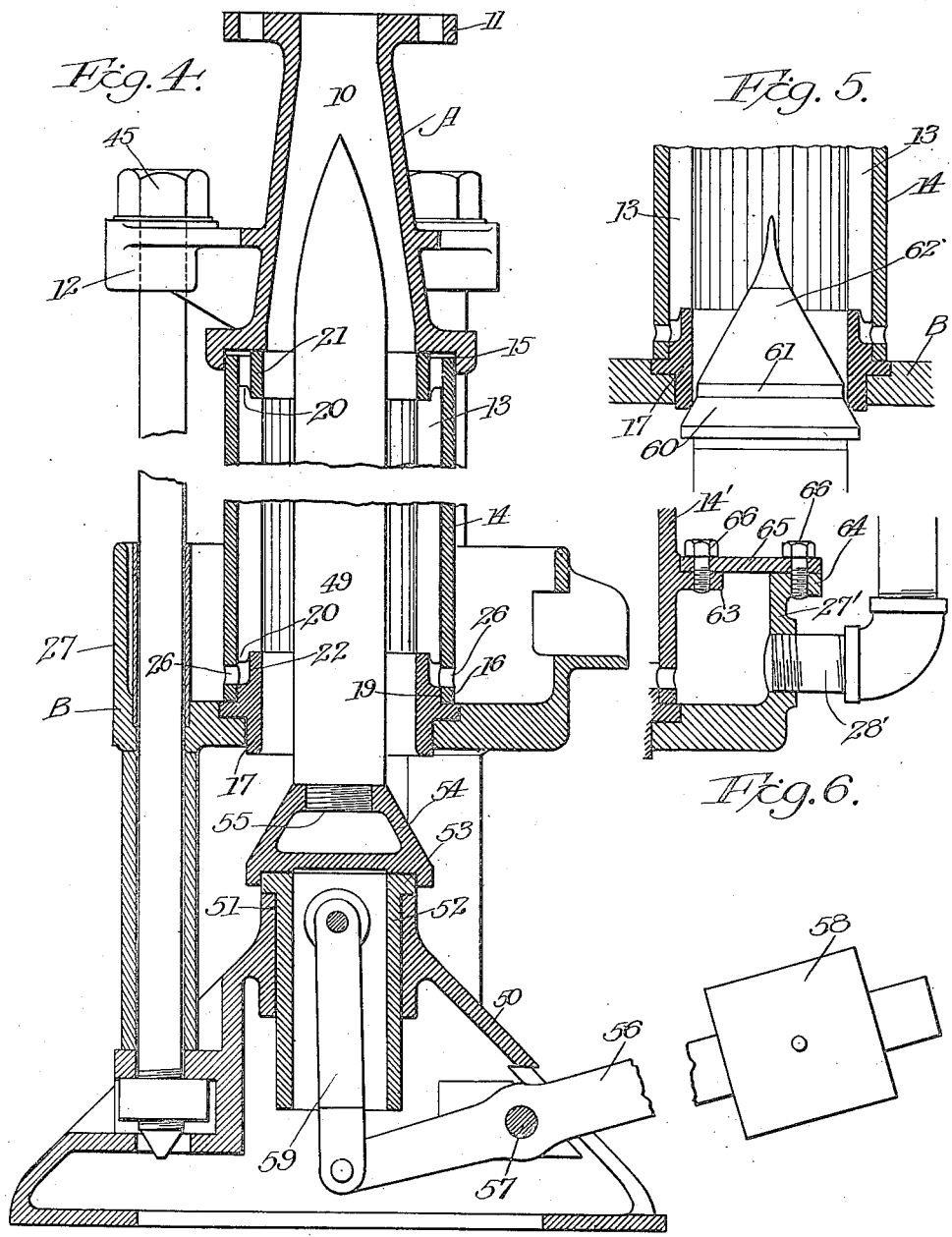

Patented Dec. 18, 1923.

1,477,986

UNITED STATES PATENT OFFICE.

BURCHARD THOENS, OF NEW YORK, N. Y., ASSIGNOR OF ONE-HALF TO EMILE J. MÉTÉRIE, OF EAST ORANGE, NEW JERSEY.

FILTERING APPARATUS.

Application filed August 4, 1917. Serial No. 184,459.

*To all whom it may concern:*

Be it known that I, BURCHARD THOENS, a citizen of the United States, and resident of New York, county and State of New York, have invented certain new and useful Improvements in Filtering Apparatus, of which the following is a specification.

This invention relates to a method and apparatus for filtering fluids.

In constructions as heretofore provided the filtering has been accomplished by forcing the fluid through cloth, sand, bone black or other suitable porous material. This filtering substance soon becomes clogged and inefficient and therefore has to be washed or removed and revived by any one of various processes which entail considerable loss of material and require more or less expensive manipulation. Because of the fact that the porous material used as the filtering means gradually becomes clogged the capacity of the filter correspondingly decreases in proportion to the length of time that it is in operation. Hence the filtering capacity of these constructions is relatively small. Furthermore, considerable time is lost in revivifying the filtering material with a consequent loss of the use of the filter while this operation is being performed.

It is one of the principal objects of this invention to provide a filter construction which is not subject to the defects mentioned above. To this end my improved continuously acting filter comprises means for conducting the fluid to be filtered to the filter, means for filtering the fluid which utilizes the sediments as part of the same, means for conducting away the filtrate and means for removing the sediments without interrupting the operation of the filter.

Other objects of the invention will be apparent from the description taken in connection with the drawings, in which:—

Figure 1 is a longitudinal sectional view through the filter construction and showing the valve for controlling the discharge of the sediments in half elevation;

Figure 2 is a partial cross sectional view through the filter bars and showing the means for adjusting the degree of contact of said bars;

Figure 3 is a detail sectional view showing a modified form of valve which may be used for certain fluids;

Figure 4 is a longitudinal sectional view of the filter construction showing another form of valve for controlling the discharge of the sediments and a means for regulating the thickness of the mass of sediments;

Figure 5 is a detail sectional view showing still another form of valve for controlling the discharge opening;

Figure 6 is a sectional view through another form of receptacle or well.

The preferred embodiment of my invention as illustrated in the drawings consists of two end members A and B and a base member C. The fluid to be filtered may be fed to the end member A by a pump or any other desired means and said member is formed with an interior passage 10 which is in communication with the filter proper. The top of the member A may be formed with a flange 11 for connecting the same to the discharge pipe from the pump. At its lower end this member A may be formed with a plurality of lugs 12 for a purpose presently to be described.

The filter proper is clamped between the members A and B and consists of a plurality of parallel bars 13 arranged in contact with the inner cylindrical surface of a tubular member 14. This tubular member has its upper end extending into a counter-bore 15 formed in the lower end of the member A and its lower end is fitted to a seat 16 formed on a ring 17 which in turn has a peripheral flange 18 arranged in the seat 19 in the member B. As shown in Figure 1, the bars 13 may be formed with projections 20 at their ends which are adapted to secure said bars in proper position. For instance, the upper projections 20 of the bars 13 are adapted to be arranged between the tubular member 14 and a ring 21. The lower ends of these bars have their projections 20 similarly arranged between the tubular member 14 and an axial extension 22 of the member 17.

As illustrated in Figure 2 the bars 13 may be rectangular in cross section and are arranged, as previously stated, in the interior of the tubular member 14. Because of this arrangement of the bars the inner longitudinal edge of one bar is substantially in contact with the inner longitudinal edge of an adjacent bar. Thus the bars 13 make what might be termed a line contact with each other. The degree of contact or the extremely small space between the adjacent inner longitudinal edges of the bars may be adjusted by the means illustrated in Figure 2 which consists of a cylindrical bar 23 which is adapted to be forced inwardly toward the axis of the tubular member 14 by one or more set screws 24. It will be apparent that as this bar is forced inward the rectangular bars will be forced into closer contact. It will be noted that substantially triangular spaces 25 are formed between adjacent bars 13 and these spaces afford passages for the filtrate which may percolate through the contacting edges of the bars 13. This filtrate will pass downward through the spaces 25 and may then be discharged through the apertures 26 formed at the lower end of the tubular member 14. Thus the filtrate will be discharged onto the member B and this member may be formed with an upstanding peripheral flange 27 to thereby form between the said flange and the tubular member 14 a receptacle for the filtrate. The filtrate thus collected on the member B may be discharged through a pipe 28 or any other desired means.

My improved means for discharging the sediments without interrupting the operation of the filter will now be described. The base C may be formed with a cylinder 29 in which is adapted to slide a piston member 30. The base may be provided with a conduit 31 for carrying a fluid under pressure to the cylinder 29. The piston 30 may be provided with the usual packing 32 and at its upper end carries a valve member 33 which has a peripheral edge 34 adapted to seat against the ring 17. The upper surface of the valve member 33 may be of substantially conical shape in order to afford a smooth surface for discharging the sediments. Between the valve member 33 and the lower portion of the piston 30 a spacing member 35 is interposed and connected with both the valve member and piston. This spacing member at its base is provided with the radially projecting flange 36, the outer surface of which is substantially that of a conical-frustum, and projects beyond the periphery of the valve member 33 so that as the sediments pass over the valve they will be deflected radially outward by this flange 36. Furthermore, the flange 36 is adapted to seat on the upper end 37 of the cylinder 29, thus limiting the downward movement of the piston and consequently the extent of the opening of the valve member 33.

The base member C may be provided with a plurality of lugs 38 which are arranged so as to form recesses 39 adapted to receive nuts 40. The lugs 38 are formed with vertical bores 41 which are adapted to align with bores 42 in the end member B and bores 43 in the lugs 12 formed on the end member A. Bolts 44 are adapted to extend through these alined bores and each may have a head 45 seating on the lug 12 and extending into a nut 40 arranged in the recess 39. Between the end member B and lugs 38 on the base C, spacing members 45 may be arranged around the bolts 44 and where said bolts extend through the receptacle formed in the member B a sleeve 46 may be arranged around the same and seated in the said member B. Thus it will be apparent that when the bolts 44 are turned up that the base member and the two end members will be securely clamped together and that the tubular member 14 together with the filter bars will be held in operative positions.

In the operation of the device the fluid containing solid matter therein is pumped to the end member A and through the passage 10 is conducted to the filter bars 13. Of course, the valve member 33 is forced to its seat to close the opening in the ring member 17 by fluid pressure exerted against the piston 30 and conducted to the cylinder 29 by the conduit 31. Thus the sediments will collect on the valve surface 33 and the filtrate will pass through the space between the bars 13 and be conducted through the apertures 26 and to the discharge pipe 28. As the filter continues in operation the sediments will form a thicker bed on the valve surface 33 until they extend upward into the end member A, thus aiding the bars 13 in performing the filtering function. The continued pressure on the sediments, of course, will compact them and finally the resistance to the passage of the fluid through the same will be such that the pressure exerted on the bottom of the piston 30 will be overcome and the valve 33 will open, permitting more or less of the sediments to be discharged downward through the ring 17. In this downward movement of the sediments they will slide along the bars 13 thus wiping them clean, causing an increased filtration and reducing the pump pressure. Consequently the hydraulic pressure acting on the piston 30 will now overbalance the pump pressure and the valve 33 will be closed or partially closed. Finally for a given pressure on the bottom of the piston 30 a condition of equilibrium will be attained in which the pump pressure and the pressure exerted against the bottom of the piston 30 will substantially balance with the valve 33 probably slightly open so that there is a continuous discharge of sediments. Of course, this point of equilibrium will depend on the material and be different for different sediments, with a given pressure acting on the bottom of the piston 30.

For some classes of sediments, especially those which are slimy or slippery, it is found that very little opening of the valve is required and also that very little pressure is needed to expel the sediments. In filtering such materials the piston and hydraulic pressure acting against the same is not necessary and the form of valve illustrated in Figure 3 may be used. As shown in this figure the valve 33' is provided with a threaded shank 47 which is threaded into the base member C'. Suitable radial holes 48 may be provided for turning the valve 33' to adjust it in the base member C'. The operation of this form of my invention is similar to the form illustrated in Figure 1 except that the valve 33' is adjusted to provide a predetermined opening for the discharge of the sediments. Consequently the operation is continuous, there being a continual feed of fluid to be filtered, a continual discharge of filtrate and a continual discharge of sediments.

In filtering fluids having only a small percentage of solids it requires considerable time to fill the tubular space enclosed by the filter bars, clog the small space between the bars, and creates such a resistance to the filtering operation that the sediment discharge valve will open. In order to provide a filter which will operate more efficiently for this class of fluids I have devised the structure illustrated in Figure 4. It will be observed that a cylindrical member 49 is arranged within the tube of filter bars thereby forming an annular space into which the fluid to be filtered is fed. As the sediments collect at the bottom of the tube this space will be gradually filled and the thickness of the mass of sediments will thus be controlled by the size of the cylindrical member or stem 49. This stem is shown as carried by the discharge valve, although it is obvious that it might be mounted in the filter in other ways. In connection with the filter illustrated in Figure 4, I have also shown another form of discharge valve adapted to be forced to its seat by yielding means such as a weight. The substantially conical base 50 of the filter is formed at its apex with a bearing 51 for the hollow valve stem 52. This valve stem is provided at its upper end with a flange 53 adapted to seat on the top of the bearing 51, thereby limiting the extent of downward movement of the valve. Mounted on top of the flange 53 is a substantially frustro-conical member 54 which is adapted to seat against the lower end of the ring 17 to thereby control the discharge of sediments from the filter. In this form of the device the cylindrical member or stem 49 may be provided with a reduced threaded end 55 which is screwed into the top member 54 of the valve. The means for forcing the valve to its seat on the ring 17 comprises a lever 56 pivoted as at 57 in the base of the machine and adjustably carrying at its outer end a weight 58, the opposite end being connected by means of the link 59 to the stem 52 of the valve. In the operation of this form of the invention it will be apparent that when the resistance to the passage of the filtrate through the filter is such that it produces a sufficient pressure on the discharge valve to overcome the force which the weight 58 exerts to keep the valve seated, the valve will open and the sediments will be discharged. The operation of this form of the invention therefore is similar to that illustrated in Figure 1 except that a different means is used for forcing the discharge valve to its seat. Although the stem or cylindrical member 49 is shown in connection with this form of valve it is obvious that it is adapted for use in connection with other types of valves.

Figure 5 illustrates a valve having a frustro-conical portion 60 which is adapted to seat against the ring 17. Just above this portion is a cylindrical portion 61 the diameter of which is slightly less than the inside diameter of the ring 17, thereby forming an annular space between the ring and the cylindrical portion 61. Above this cylindrical portion the valve may be provided with a conical or pointed top portion 62. When the sediments collect on top of this valve a portion of them will be wedged into the annular space between the ring 17 and the cylindrical portion 61 of the valve, thereby aiding in forming a tight valve and eliminating the necessity of grinding the portion 60 to a seat on the ring 17.

For some services it is desirable to discharge the filtrate to a higher elevation than the receptacle or well for the filtrate. In order to make use of the pump which supplies the filter with the fluid for this purpose, the well or receptacle may be closed. Thus the tubular member 14' may be formed with a flange 63 and the peripheral flange 27' of the well may be formed with a flange 64 the top surface of which is flush with the top surface of the flange 63. An annular plate 65 is secured to these two flanges by means of bolts 66, thus enclosing the receptacle or well so that the filtrate may be forced under pressure through the discharge pipe 28' to the desired point.

Although several forms of my invention have been described specifically, it is obvious that the details thereof may be varied considerably without departing from the spirit thereof. For instance, the form of the bars 13 need not be rectangular in cross section and other shapes might be utilized.

Having thus described the invention what is claimed and desired to be secured by Letters Patent is:

1. A filter construction including a plurality of bars, adjustable means for forcing and holding each bar substantially in contact with its adjacent bar, means for conducting fluid to be filtered to said bars and means for conducting away the filtrate which passes through between the bars.

2. A filter construction including a tubular member, filtering means comprising a plurality of parallel bars only, arranged against the interior surface of said member, means for conducting fluid to be filtered to the space inside said bars, and means for conducting away the filtrate which passes through between said bars.

3. A filter construction including a tubular member, a plurality of parallel bars arranged against the interior surface of said member with the longitudinal inside edge of one bar substantially in contact with an adjacent bar, a valve controlled passage at one end of the tube for discharging the sediments while the filter is in operation and said tubular member being formed with a filtrate discharge opening.

4. A filter construction including a tubular member, a plurality of parallel bars arranged inside said member with the longitudinal inside edge of one bar substantially in contact with an adjacent bar, means for forcing the bars toward each other to adjust the degree of contact between said bars, a valve controlled passage at one end of the tube for discharging the sediments while the filter is in operation and said tubular member being formed with a filtrate discharge opening.

5. A filter construction including two end members each having a central opening therethrough, a tubular member clamped between the end members, filtering means arranged in the form of a tube carried by said tubular member and the interior space of said means connecting the openings in the end members, the opening in one of said end members adapted to conduct fluid to be filtered to said filtering means and the other having a valve adapted to control its opening, and said tubular member having a filtrate discharge opening.

6. A filter construction including a plurality of parallel bars arranged to form a tube, means for supporting said bars with their inner adjacent longitudinal edges substantially in contact, means for conducting fluid to be filtered into one end of the tube, means for conducting away the filtrate which passes through between the bars, and a cylindrical member arranged within said tube and of smaller diameter than the tube.

7. A filter construction including a plurality of parallel bars arranged to form a tube, means for securing the bars against movement, means for conducting fluid to be filtered into one end of the tube, means for conducting away the filtrate which passes through between the bars, a valve at the other end of the tube for controlling the discharge of the sediments, and a stem carried by said valve and projecting into said tube.

In testimony whereof I affix my signature.

BURCHARD THOENS.